July 18, 1933.   J. F. LINCOLN ET AL   1,918,763
DYNAMO ELECTRIC MACHINE
Filed July 31, 1928   2 Sheets-Sheet 1

INVENTORS
James F. Lincoln and
Erwin E. Dreese.
BY Fay Oberlin & Fay
ATTORNEYS.

July 18, 1933.   J. F. LINCOLN ET AL   1,918,763
DYNAMO ELECTRIC MACHINE
Filed July 31, 1928   2 Sheets-Sheet 2

INVENTORS
James F. Lincoln and
BY Erwin E. Dreese.
Fay Oberlin & Fay
ATTORNEYS.

Patented July 18, 1933

1,918,763

UNITED STATES PATENT OFFICE

JAMES F. LINCOLN, OF EAST CLEVELAND, AND ERWIN E. DREESE, OF EUCLID, OHIO, ASSIGNORS TO THE LINCOLN ELECTRIC COMPANY, OF CLEVELAND, OHIO, A CORPORATION OF OHIO

DYNAMO-ELECTRIC MACHINE

Application filed July 31, 1928. Serial No. 296,525.

The present invention, relating, as indicated, to dynamo-electric machines, has more particular reference to machines of the type having a rotor mounted within a stator, and its principal object is the provision of an improved system of ventilating the stator; this system contemplating providing the stator laminations with peripherally arranged and preferably integral tabs or projections which, in the assembled stator, are disposable in different relative positions to obtain a radiating surface of greater or less extent; this surface, when encased by a desirably removable shell of sheet metal or the like and suitably positioned with reference to barriers comprised in the end-bearing brackets, forming a large number of longitudinal and circumferential channels or passageways through which air may be circulated for cooling purposes.

The stator ventilating system provided by our invention is particularly suited to use with completely enclosed dynamo-electric machines intended for operation in dust or fume laden air. Accordingly, and with the object of providing adequate cooling for such parts as are enclosed by the imperforate end brackets, our invention provides such brackets with inner heat absorbing ribs and outer radiating ribs; these latter being preferably enclosed by cap members to form chambers in advance and continuation of the stator grooves in order that the same currents of air circulated through such grooves may also be employed for abstracting heat from the radiating bracket ribs, thereby effectively cooling the confined air and enclosed parts of the machine as well as the laminations of the stator.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings.

Figure 1:
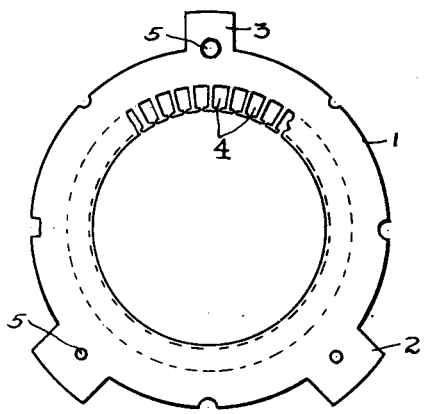
Figure 2:
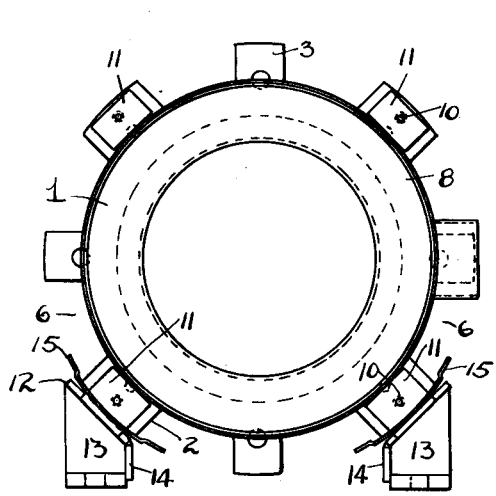
Figure 3:
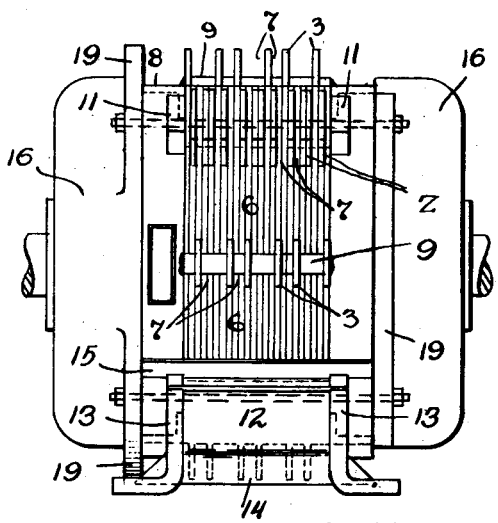
Figure 4:
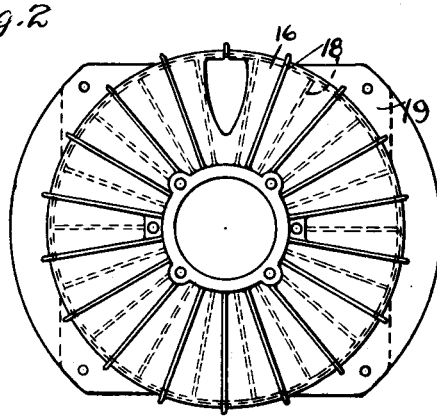
Figure 5:
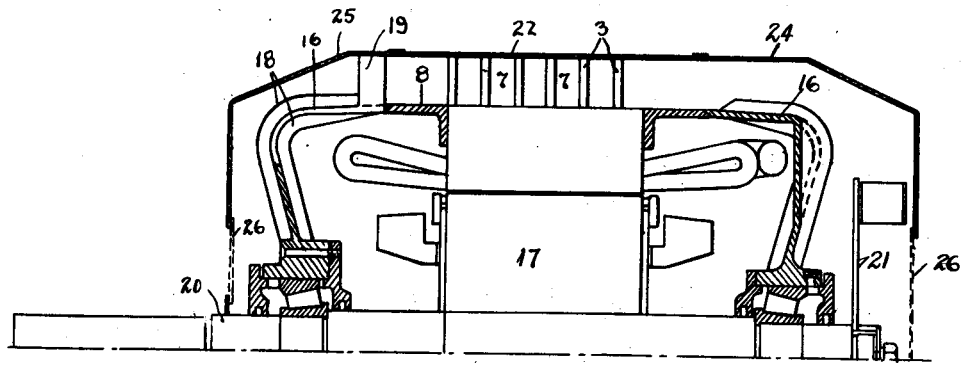
Figure 6:
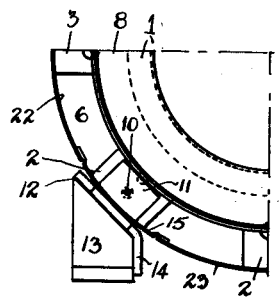
Figure 7:
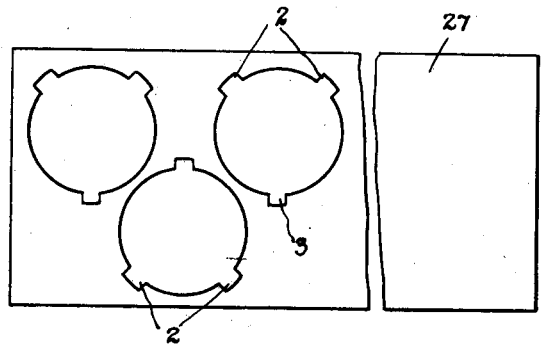
Figure 8:
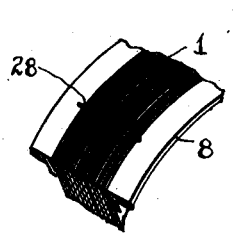
Figure 9:
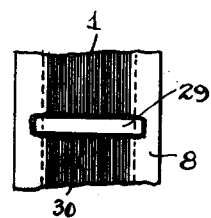

Fig. 1 is a side elevational view of a stator lamination of the kind contemplated by this invention; Fig. 2 is an end elevation of a stator compounded of laminations of the kind shown in Fig. 1; Fig. 3 is a side elevational view of a stator such as shown in Fig. 2; Fig. 4 is an end elevation of an end-bearing bracket having inwardly and outwardly directed fins or ribs for assisti ig in conducting heat from the inside of the machine, and radially extending barriers or baffles for forming air conveying passages of the stator grooves; Fig. 5 is a partly diagrammatic vertical section of one-half of a dynamo-electric machine embodying the present improvements; Fig. 6 is a quarter end elevation showing a supporting leg construction and illustrating the manner of securing the cover sections around the stator; Fig. 7 is a plan view depicting an improved and economical system of punching stator laminations from a sheet of stock; Fig. 8 is a fragmentary perspective view of a welding method of securing stacked or assembled laminations together; and Fig. 9 is a fragmentary plan view illustrating still another manner of securing laminations in assembled relation.

In the drawings, and with particular reference to Fig. 1, this invention is shown as comprising a stator lamination 1 having radially projecting tabs 2 and 3, stator-winding receiving notches 4 and holes 5 through which rivets, bolts or rods may be passed for securing the stacked or assembled laminations together and the rotor supporting brackets to the ends of the stator. The tabs 2 and 3 may be formed in any desired number and preferably have similar positions with relation to the holes 5 in order that two or more laminations or groups of laminations superposed with their holes in registry can be angularly displaced and secured together in the manner hereinafter described.

In building up a stator from separate laminations of this kind, single laminations may be exactly superposed with their corresponding tabs and holes in alignment, and the groups or sections so formed stacked in such a way that the corresponding (in width) tabs of periodically recurring groups are in alignment and the holes of all laminations in registry. By including more or fewer laminations in each section and increasing or diminishing the number of sections comprised in a stator of specified length, the area of the radiating surface, and therefore the effectiveness of the cooling currents of air, can be regulated; such currents coming into contact with a maximum area and having a maximum cooling effect when the groups of laminations are relatively thin and their number proportionally large, and coming into contact with a minimum area and having a reduced cooling effect when the groups of laminations are relatively thick and their number correspondingly small. The stator shown in Figs. 2 and 3 has eight radially extending and axially interrupted series of projections produced by alternately rotating successively stacked sections or groups of laminations, first ninety and then one hundred and eighty degrees. Between these series of projections are longitudinal grooves 6, and intermediate the successive compound tabs of each series are peripheral grooves 7, the former serving as air inlet and outlet passageways, and the latter, except such as are disposed centrally of the inlet and outlet passageways at the 0—90—180 and 270° positions, serving as circumferential conductors between the longitudinal grooves that form inlet and outlet passageways, respectively.

To each end of the stator assembled in the above manner is attached an angle-shaped ring 8, these rings being secured to, and the stator laminations together by, rods 9 which pass through the holes in the tabs 3 and have their ends welded to said rings as shown in Fig. 3. Opposite the stator tabs 2, and provided with openings 10 in alignment with the holes in such tabs, are suitable lugs 11 which are secured to the rings 8. The lowermost two of these lugs project beyond the circumference defined by the stator tabs, and engage with axially arranged bars 12 which carry suitable legs 13 connected by other bars 14 whose upper edges are secured to the adjacent edges of the bars 12. Interposed between the bars 12 and the stator tabs 2 are arcuate strips 15, through which the lugs 11 project and to which the stator covering is removably secured in the manner later explained.

The imperforate end-bearing brackets 16 which carry the rotor 17 are provided with inwardly and outwardly directed heat collecting and radiating fins or ribs 18, and radial flanges or barriers 19. When these brackets are secured to the ends of the stator by bolts passing through the openings provided in the tabs 2 and the openings 10 in the lugs 11, the flanges 19 cover two adjacent longitudinal passageways at opposite sides and in positions angularly displaced by ninety degrees. In other words, the flanges of one bracket cover four longitudinal passageways, (two on each side) and the flange of the opposite bracket covers the other four passageways, this resulting in converting some of said passageways into inlet ducts and the remaining passageways into outlet ducts with the peripheral passageways between the wide compound tabs 2 of the stator sections and the baffles 19 serving to respectively conduct and direct the cooling air from the first into the second, and the peripheral grooves between the narrow tabs 3 serving to more effectively cool the stator areas within the inlet and outlet passageways. As shown in Fig. 5, the end brackets 16 seat against the rings 8 and their central openings are provided with bearings for revolubly supporting the stator shaft 20 which, on one end, carries a fan or blower 21.

Surrounding the stator on its upper side is a casing 22 and on its lower side or bottom a curved plate 23; both of these members being desirably formed of light sheet metal and both detachably secured to the edges of the arcuate strips 15, thereby enclosing the stator and completing the formation of the above-described air conducting passageways. Removably secured to the flanges 19 of the bearing brackets 16 are suitable sheet metal end caps 24 and 25, the former enclosing the blower 21 and the latter at the opposite end of the machine forming a surface for directing cooling air against the radiating fins of the contiguous bracket. The cap 24 has a screened opening 26 for admitting cooling air from the outside atmosphere and the cap 25 has a similar opening through which such air may escape after having passed into contact with the radiators of both end brackets and through the tortuous passageways formed of the stator grooves by the casings 22 and 23. The inside of the machine shown in Fig. 5 may be additionally cooled by suitable fans secured to, or embodied in, the rotor, such fans acting to circulate a confined volume of air into contact with the inside parts and the inner heat-abstracting fins. Fan blades suitable for this purpose are shown projecting from the ends of the rotor and, of course, revolve with such rotor when the machine is in operation.

As previously noted, the stator laminations 1 may be formed with any desired number of tabs or projections 2 and 3 but, possible economies in the punching operation by which they are produced, make the use of three-tab laminations preferable. As shown in Fig. 7, such laminations can be punched from a sheet of stock 27 of generally rectangular shape, the tabs 2, for example, of each lamination being formed from marginal parts of the sheet and the tabs 3 being formed from the ordinarily wasted part of the sheet between the punched-out laminations of the opposite series, these two series being staggered as shown. This system of punching, while devised for the manufacture of stator laminations of the kind utilized in the present invention, is also applicable to the punching of other parts of similar shape and, when so employed, will result in corresponding economies attendant upon the utilization of waste parts of the stock occurring between the openings left by the punched-out parts.

Instead of providing the individual stator laminations with holes adapted for receiving the rods or rivets by which the laminations and groups of laminations are secured together, the expedient illustrated in Fig. 8 may be adopted. This view shows a welding process that may be employed for the indicated purpose, a transverse weld 28 being formed across the edges of the separate laminations or groups of laminations and the rings 8 by either heating and fusing such edges to cause the metal to coalesce or by depositing additional metal and welding it to the edges of the laminations. This method of securing stator laminations or other similar fabrications together can be employed wherever applicable and its usefulness is not confined to the purpose just explained.

As a further method of securing the stator laminations and their end rings in assembled relation, a bar or rod 29 may be disposed transversely as shown in Fig. 9 and its edges welded to the surfaces presented by the stator and the outsides of the rings 8 as indicated at 30. Either of these processes may be employed alone or in combination with the welded rivet rod illustrated in Fig. 9 and, when used independently, greatly simplify the punchings by obviating the necessity for providing rod and bolt receiving holes and peripheral notches for permitting the passage of bolts or rods through, or adjacent to, the main stator mass.

It will be understood that the stator laminations provided by our invention can be used with ventilating systems other than that described and explained, the particular arrangement of air conducting passageways formed between the stator grooves and their outside covering being adapted for combination with most any circulatory system providing for stator cooling either alone or, as part of a system contemplating rotor cooling as well. Also, it will be apparent that, in the machine illustrated, the stator end brackets completely enclose the rotor and all inside windings, collectors, commutators, et cetera, to thereby provide, with the outside blower shown in Fig. 5, an external stator cooling system designed with a view to adequate cooling and the exclusion of dust, fumes, and other damaging substances from the inside of the machine which may be separately cooled by confined air set in motion by suitable fans and the heat absorbing and radiating fins formed on the end brackets, or otherwise. Moreover, it will be understood that the stator casing and end caps may be readily removed to facilitate cleaning of the cooling passageways of any accumulations escaping the screens provided in the air inlet and exit openings.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a dynamo-electric machine, a stator of laminated construction having peripheral tabs arranged to form longitudinal and circumferential grooves, a casing enclosing said stator to form passageways of said grooves, means for moving air through such passageways, and end covers of a uniform shape with cut-away segments, said end covers being mounted with an angular displacement relative to each other to provide inlets for some of such passageways and outlets for others.

2. In combination with a dynamo-electric machine having a stator made up of a uniform type of element having tabs to provide peripheral grooves, uniform end pieces having bearings and diversely positioned air openings at the respective ends, a rotor shaft mounted in said bearings, a casing enclosing said stator and grooves, a casing projecting beyond one of said end pieces and forming a chamber, and a fan mounted on said rotor shaft within said chamber.

3. In a dynamo-electric machine, a laminated stator, end rings on opposite sides of said laminated stator, and means for supporting said stator in assembled relation, said means comprising bars extending from one end ring to the other across said laminated stator and welded to said end rings and surface welded to said laminations, said means being the only agency serving to maintain the laminations in such assembled relation.

Signed by us, this 28th day of July, 1928.
JAMES F. LINCOLN.
ERWIN E. DREESE.